United States Patent

Pan et al.

[11] Patent Number: 5,941,939
[45] Date of Patent: *Aug. 24, 1999

[54] LOGARITHM/INVERSE-LOGARITHM CONVERTER AND METHOD OF USING SAME

[75] Inventors: Shao Wei Pan, Schaumburg; Shay-Ping Thomas Wang, Long Grove, both of Ill.

[73] Assignee: Motorola, Inc., Schaumburg, Ill.

[*] Notice: This patent is subject to a terminal disclaimer.

[21] Appl. No.: 08/881,903

[22] Filed: Jun. 25, 1997

Related U.S. Application Data

[63] Continuation of application No. 08/381,368, Jan. 31, 1995, Pat. No. 5,642,305.

[51] Int. Cl.⁶ ............................................. G06F 7/00
[52] U.S. Cl. ................................................. 708/499
[58] Field of Search ........................... 364/748.5, 722; 358/448; 708/499, 277

[56] References Cited

U.S. PATENT DOCUMENTS

| | | | |
|---|---|---|---|
| 5,331,582 | 7/1994 | Sudo et al. | 364/722 |
| 5,343,254 | 8/1994 | Wada et al. | 348/627 |
| 5,371,609 | 12/1994 | Suzuki et al. | 358/448 |
| 5,600,581 | 2/1997 | Dworkin | 364/722 |
| 5,604,691 | 2/1997 | Dworkin | 364/722 |
| 5,642,305 | 6/1997 | Wei | 364/748.5 |
| 5,703,801 | 12/1997 | Wei | 364/748.5 |

FOREIGN PATENT DOCUMENTS

WO 93/17383   9/1993   WIPO ........................... G06F 7/52

OTHER PUBLICATIONS

A Logarithmic Vector Processor for Neural Net Applications by Steve Richfield, Neurosoft, IEEE First International Conference on Neural Networks, Sheraton Harbor Island East, San Diego, California, Jun. 21–24, 1987.

A Multiplier–Less Digital Neural Network by L. Spaaneburg, B. Hoefflinger, S. Neusser, J.A.G. Nijhuis, A. Siggelkow, IMS, Stuttgart, Germany, Proceedings of the 2nd Int'l Conference on Microelectronics for Neural Networks, Oct. 16–18, 1991, Munich, F.R. Germany.

Algorithm Design for a 30 bit Integrated Logarithmic Processor by David M. Lewis and Lawrence K. YU, Department of Electrical Engineering, University of Toronto, Proceeding 9th Symposium on Computer Arithmetic, 1989, IEEE Comp. Soc. Press, pp. 192–199.

An Architecture for Addition and Subtraction of Long Word Length Numbers in the Logarithmic Number System by David M. Lewis, Member, IEEE, IEEE Transactions on Computers, vol. 39, No. 11. Nov. 1990, pp. 1325–1336.

A 30–b Integrated Logarithmic Number System Processor by Lawrence K. Yu, Member, IEEE, and David M. Lewis, Member, IEEE, IEEE Journal of Solid–State Circuits, vol. 26, No. 10, Oct. 1991, pp. 1433–1440.

An Accurate LNS Arithmetic Unit Using Interleaved Memory Function Interpolator by David M. Lewis, Department of Electrical Engineering, University of Toronto, Proceeding 11th Symposium on Computer Arithmetic, 1993, IEEE Comp. Soc. Press, pp. 2–9.

Interleaved Memory Function Interpolators with Application to an Accurate LNS Arithmetic Unit by David M. Lewis, Member, IEEE, IEEE Transactions on Computers, vol. 43, No. 8, Aug. 1994, pp. 974–982.

(List continued on next page.)

*Primary Examiner*—Joseph E. Palys
*Assistant Examiner*—Omar A. Omar
*Attorney, Agent, or Firm*—James E. Gauger

[57] ABSTRACT

A converter, which may be used for implementing either logarithmic or inverse-logarithmic functions, includes a memory, a multiplier, and an adder. The memory stores a plurality of parameters which are derived using a least squares method to estimate a logarithmic or inverse-logarithmic function over a domain of input values.

16 Claims, 4 Drawing Sheets

OTHER PUBLICATIONS

Table–Lookup Algorithms for Elementary Functions and Their Error Analysis by Ping Tak Peter Tang, Matematics and Computer Schience Division, Argonne National Laboratory, 9700 S. Cass Ave., Argonne, IL 60439–4801, Proceeding 10th Symposium on Computer Arithmetic, Jun. 1991, pp. 232–236.

Applying Features of IEEE 754 to Sign/Logarithm Arithmetic by Mark G. Arnold, Member, IEEE, Thomas A. Bailey, Member, IEEE, John R. Cowles, and Mark D. Winkel, IEEE Transactions on Computers, vol. 41, No. 8, Aug. 1992, pp. 1040–1050.

D8.13 Improved Accuracy for Logarithmic Addition in DSP Applications by Mark G. Arnold, John Cowles, and Thomas Bailey, Computer Science Department, University of Wyoming, Laramie, WY, ICASSP 88: Int. Conf. on Acoustics, Speech and Signal Processing, vol. 3 pp. 1714–1717.

Redundant Logarithmic Number Systems by M.G. Arnold, T.A. Bailey, J.R. Cowles, J.J. Cupal, University of Wyoming, Laramie, WY, Proceeding of 9th Symposium on Computer Arithmetic, pp. 144–151, IEEE Comp. Soc. Press.

Comments on "An Architecture for Addition and Subtraction of Long Word Length Numbers in the Logarithmic Number System"[1] by M. Arnold, T. Bailey and J. Cowles, IEEE, Transactions on Computers, vol. 41, No. 6, Jun. 1992, pp. 786–788.

Redundant Logarithmic Arithmetic, Mark G. Arnold, Member IEEE, Thomas A. Bailey, Member IEEE, John R. Cowles, and Jerry J. Cupal, Members IEEE, IEEE Transactions on Computers, vol. 39, No. 8, Aug. 1990, pp. 1077–1086.

LOGARITHM/INVERSE-LOGARITHM CONVERTER AND METHOD OF USING SAME

This is a continuation division of copending application Ser. No. 08/381,368, filed on Jan. 31, 1995, now U.S. Pat. No. 5,642,305.

RELATED INVENTIONS

The present invention is related to the following inventions which are assigned to the same assignee as the present invention:

(1) "Logarithm/Inverse-Logarithm Converter Utilizing a Second-order Term and Method of Using Same", having Ser. No. 08/382,462, filed Jan. 31, 1995.

(2) "Logarithm/Inverse-Logarithm Converter Utilizing a Truncated Taylor Series and Method of Use Thereof", U.S. Pat. No. 5,604,691, filed on Jan. 31, 1995.

(4) "Neural Network Utilizing a Logarithmic Function and Method of Using Same", having Ser. No. 08/176,601, filed on Dec. 31, 1993.

The subject matter of the above-identified related inventions is hereby incorporated by reference into the disclosure of this invention.

TECHNICAL FIELD

The present invention relates generally to computing circuits and, in particular, to a computing circuit which may be used to perform either a logarithmic or inverse-logarithmic conversion on an input value.

BACKGROUND OF THE INVENTION

Logarithmic converters are devices used to implement logarithmic functions and are most commonly found in items such as hand-held calculators and spread sheet software programs. Logarithmic functions, or log functions, belong to a class of mathematical functions called transcendental functions which are important in wide variety applications such as data communications, control systems, chemical processes, and computer simulation. A log function is abbreviated with the following mathematical equation: $y=\log_b(x)$. In this equation, x represents an input value which may be any number greater than or equal to zero; b represents a base number system; and y represents a logarithm value, or log value, which corresponds to the input value x.

Inverse-log converters are devices used to implement inverse-logarithmic, or inverse-log, functions. Essentially, an inverse-log function is the reverse of a log function. What is meant by "reverse" is explained in the following discussion. A log function converts an input value, x, which is in a domain of input value into a definite log value which is in a range of log values. Basically, the log function establishes a one-to-one correspondence between input values in the domain and log values in the range. This correspondence is represented symbolically by x–>y. An inverse-log function establishes a reverse correspondence between log values and input values which is represented by y–>x. An inverse-log function is abbreviated with the following mathematical equation: $y=\log_b^{-1}(x)$. In this equation, x represents an input value; b represents a base number system; and y represents an inverse-log value which corresponds to the input value x and may be any number greater than or equal to zero. Like log functions, inverse log functions are important in a wide variety applications.

Two techniques of computing log and inverse-log values are commonly used today. Both techniques are analogously used to compute either log or inverse-log values; thus, for the sake of brevity, the following discussion will focus on using the techniques to compute log values, with the understanding that the techniques may be used in a like manner to compute inverse-log values.

The first technique involves storing a corresponding log value in a look-up table for every possible input value. This approach allows a log value to be computed relatively quickly and is practical for applications requiring limited precision and having input values within a small domain. However, in many applications this technique is impractical because it requires too great a memory space to store the look-up table. For example, in a digital system using an IEEE standard 32-bit floating point number, which has a 23-bit mantissa, such a look-up table would be required to store $2^{23}$ log values—one for every possible mantissa value. A computer memory for storing this number of log values would be prohibitively expensive, if not impossible, to build.

The second technique of computing log values involves computing a power series to approximate a log function. An example of a power series which approximates a log function is given as:

$$y=\text{Log }(1+x)=x-x^2/2+x^3/3-x^4/4+ \quad (1)$$

In this example, the log function is a specific type of log function known as a natural logarithm, which is widely used in science and engineering applications. The variables in Equation 1 are defined as follows: y represents a log value, and x represents an input value in the domain $-1 \leq x < 1$. Although the technique of using a power series to approximate a log function allows a log value to be computed with a high degree of precision, it requires a large number of computer operations and therefore requires a relatively long period of time to execute. In other words, this technique is generally slow and negatively affects the throughput of a computer.

In summary, there is a need for a converter which can perform either a log or an inverse-log function quickly, thus allowing a computer to operate with greater throughput. Such a converter should also reduce the amount of memory space required to perform the conversions, and it should produce log or inverse-log values which have a high degree of precision.

BRIEF DESCRIPTIONS OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

It is an advantage of the present invention to provide a converter which can be used to perform either a logarithmic or inverse-logarithmic conversion in a computer, processor or circuit, without altering the design of the converter. A further advantage of the present invention is that it provides a converter which computes log and inverse-log values with a high degree of precision. Yet another advantage of the present invention is that it provides a converter which requires a significantly reduced amount of memory space and may be efficiently implemented in an integrated circuit which consumes little power. An additional advantage of the present invention is to provide a method of using the converter to produce either log or inverse-log values.

Generally, the present invention provides a converter for computing either a log or an inverse-log functions. The converter comprises a memory and an arithmetic means. The memory stores a plurality of parameters, wherein the parameters are calculated using a least squares method to estimate either a log or an inverse-log function over a domain of input values. The arithmetic means generates a log or an inverse-log value, depending on the parameters stored in the memory, by performing arithmetic operations on an input value and ones of the parameters.

The converter may be easily re-configured to perform either log or inverse-log functions, or functions having a different base number system or domain of input values, by loading the memory with a different set of parameters.

Figure 1:
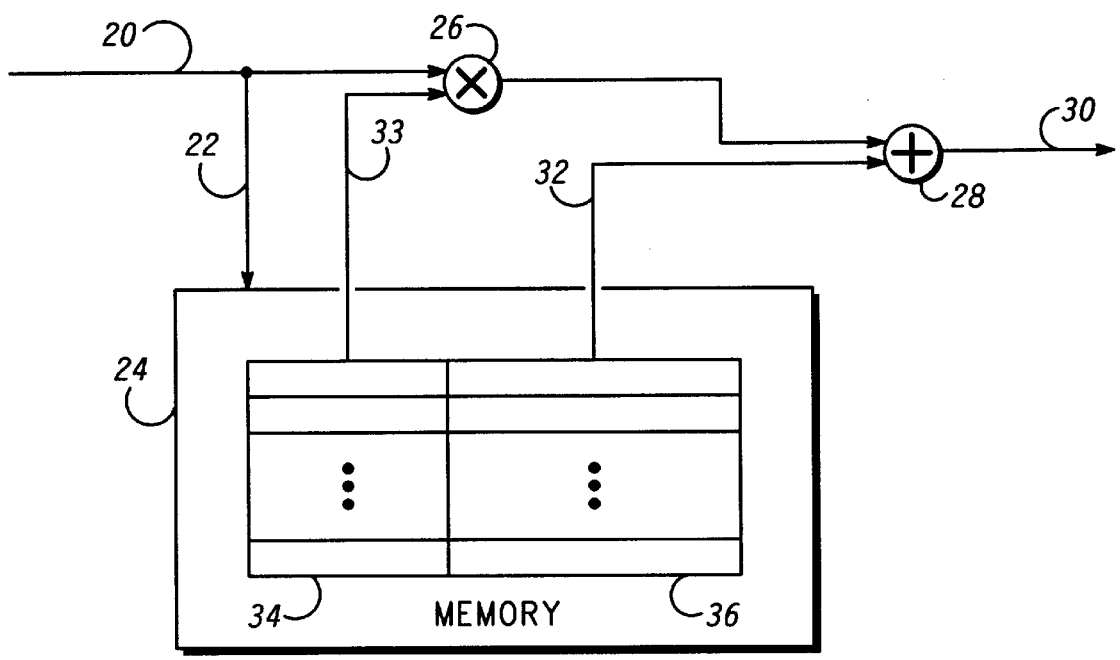
FIG. 1 illustrates a logarithm/inverse-logarithm converter in accordance with a preferred embodiment of the present invention.

FIG. 1 illustrates a logarithm/inverse-logarithm converter in accordance with a preferred embodiment of the present invention. The converter comprises a memory 24, a multiplier 26, and an adder 28. The memory 24 stores a plurality of parameter pairs. Each parameter pair is calculated using a least squares method to estimate either a log or an inverse-log function over an interval of input values. Each parameter pair has a zero-order parameter, which is stored in a zero-order look-up table 36, and a first-order parameter, which is stored in a first-order look-up table 34.

The converter operates as follows. An input value 20 provides an address 22 which is used to retrieve a corresponding parameter pair from the zero-order and first-order look-up tables 36, 34. In a preferred embodiment, the input value 20 is a binary value having a length of 16 bits, denoted by [15:0], wherein the most significant eight bits, [15:8], of the input value 20 are provided to the memory 24 as the address 22. Additionally, the zero-order and first-order parameters are located in the memory 24 at a common address which corresponds to the input value 20.

The memory 24 provides as output the zero-order parameter 32 and the first-order parameter 33 which correspond to the input value 20. In a preferred embodiment, the zero-order parameter 32 is a 17-bit binary value and the first-order parameter 33 is a 9-bit value. A total of 256 parameter pairs are stored in the memory 24.

The multiplier 26 multiplies the first-order parameter 33 by the bit slice 21 to produce a proportional term. Although the bit slice 21 may include the entire input value 20, in a preferred embodiment, it includes the eight least significant bits, [7:0], of the input value 20. The adder 28 sums the proportional term and the zero-order parameter 32 to produce an output value 30. In a preferred embodiment, the adder 28 generates an output which is one bit greater in length than the desired length of the output value 30. Thus, to generate the output value 30, which preferably has a length of 16 bits, the adder generates a 17-bit output and the least significant bit of the output is discarded.

In one embodiment of the present invention, the converter is implemented with an integrated circuit. However, one of ordinary skill will recognize that a programmable logic array, application specific integrated circuit (ASIC), or other digital logic device, as well as software running on a processor such as a microprocessor could also be used to implement the converter.

Figure 2:
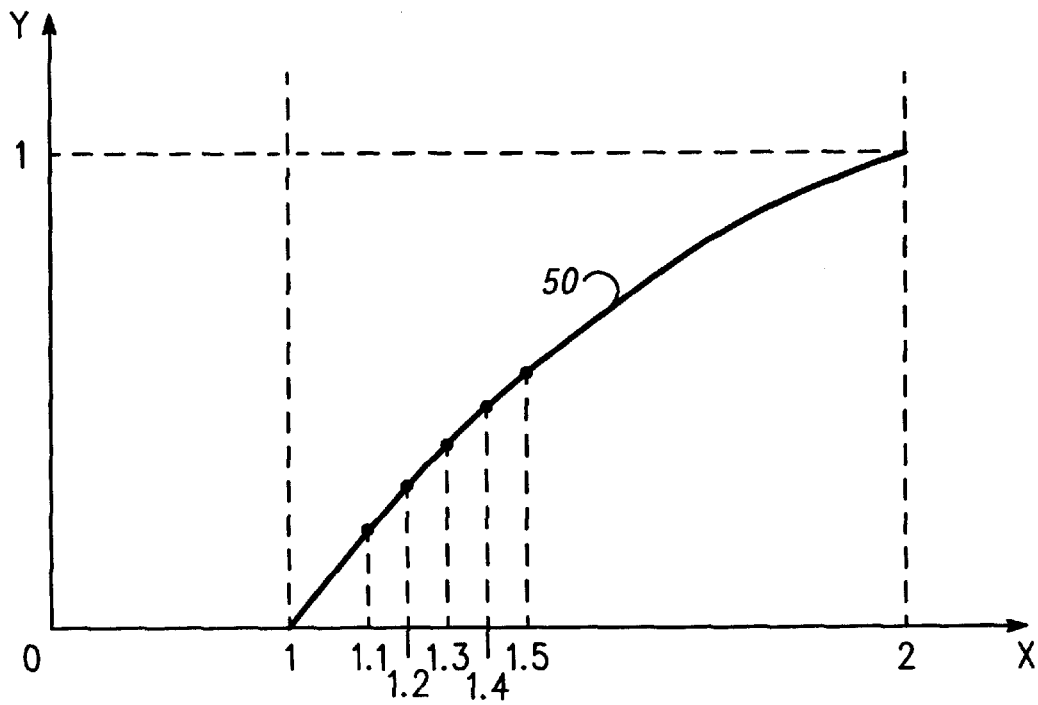
FIG. 2 shows a graph of a logarithmic function.

FIG. 2 shows a graph of a logarithmic function 50 over a domain of input values. The input values are given along the x-axis and the log values are given along the y-axis. The domain of the input values is 1 to 2, and the range of the log values is 0 to 1. Several intervals within the domain are indicated with vertical dotted lines at input values 1.1, 1.2, 1.3. 1.4, and 1.5. Each interval contains data points between the dotted lines. The log function 50 uses a base number system of two.

Figure 3:
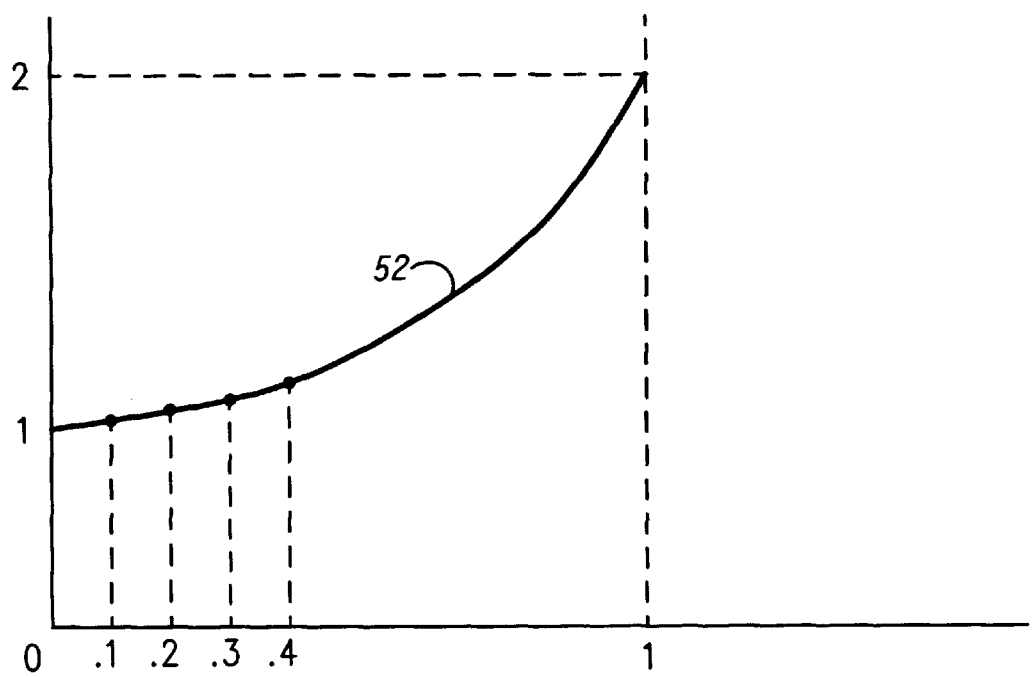
FIG. 3 shows a graph of an inverse-logarithmic function.

FIG. 3 shows a graph of an inverse-logarithmic function 52 over a domain of input values. The input values are given along the x-axis and the inverse-log values are given along the y-axis. The domain of the input values is 0 to 1, and the range of the inverse-log values is 1 to 2. Several intervals within the domain are indicated with vertical dotted lines at input values 0.1, 0.2, 0.3, and 0.4. Each interval contains data points between the dotted lines. The inverse-log function 52 also uses a base two number system.

One of ordinary skill in the art will realize that the converter of the present invention may be used for computing any log or inverse-log function; however, in a preferred embodiment of the present invention, the converter computes the log function depicted in FIG. 2 and the inverse-log function depicted in FIG. 3. Input values are converted to a floating point binary word having one sign bit, a 16-bit mantissa, and a 6-bit exponent. Only the mantissa is provided to the converter as the input value 20. Both the sign bit and exponent bypass the converter and are later combined with the output value 30. Essentially, the converter computes either $y=\log_2^{-1}(1.M)$ or $y=\log_2^{-1}(1.M)$, where y represents the output value and M represents the mantissa. The exponent of the floating point number is a base-two value, $2^e$, where e represents the exponent. A log or an inverse-log value corresponding to the floating point number is generated by summing of the output value 30 and the exponent value following conversion of the mantissa. This summation results in a value which is represented in a fixed point number format having a j-bit fractional portion and a k-bit integer portion. The integers j and k can vary, depending on the desired precision of the converter.

Figure 4:
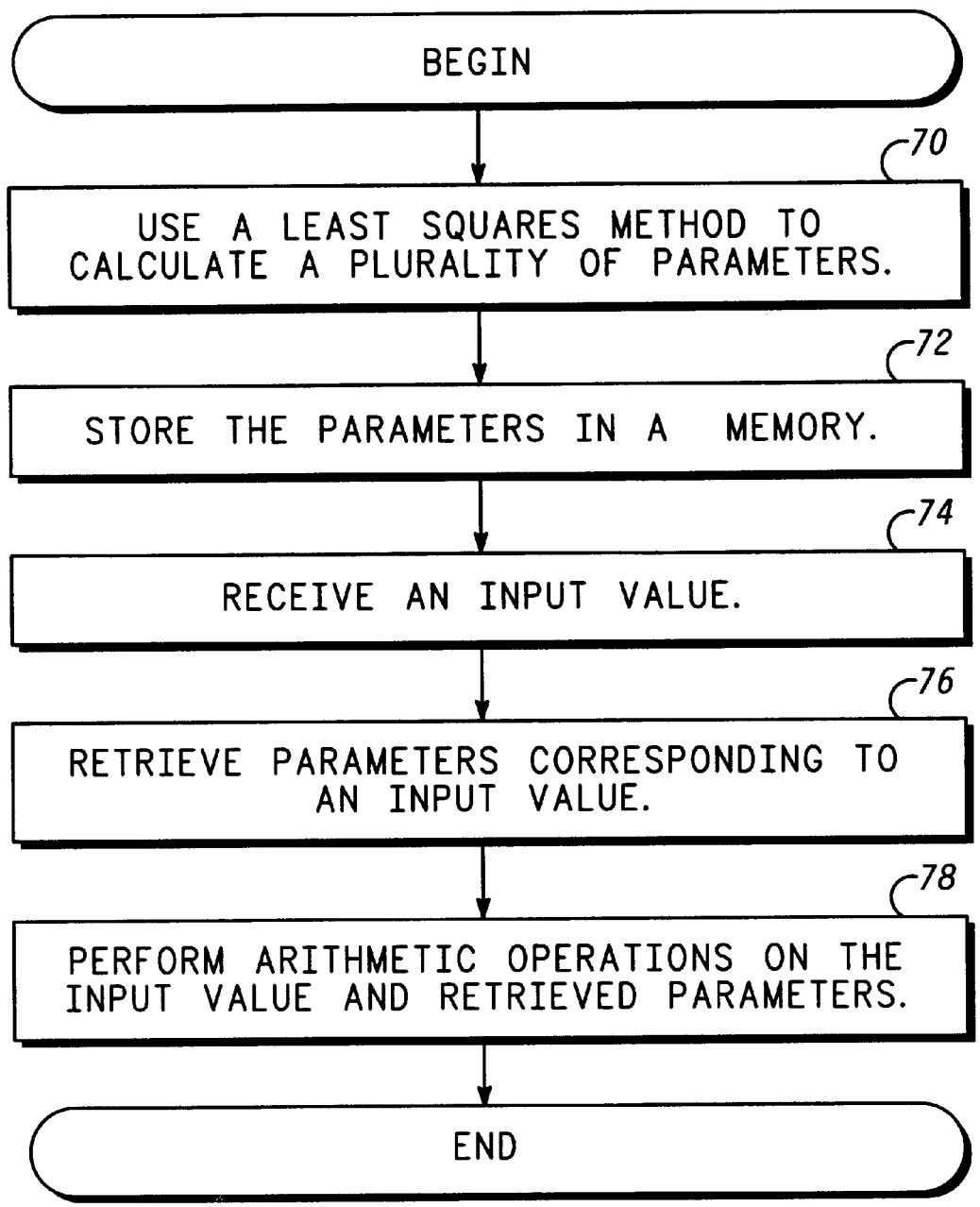
FIG. 4 illustrates a flow chart diagram of a method of using the logarithm/inverse-logarithm converter shown in FIG. 1.

FIG. 4 illustrates a flow chart diagram of a method of using the logarithm/inverse-logarithm converter shown in FIG. 1. The method may be used for generating either a log value or an inverse-log value. In box 70, a plurality of parameters is calculated using a least squares method to estimate either a log or an inverse-log function. In box 72, the parameters are stored in the memory 24. Parameters corresponding to a single input value may be stored at the same address in the memory 24. In box 74, an input value 20 is received. Next, in box 76, parameters which correspond to the input value 20 are retrieve from the memory 24.

In box 78, arithmetic operations are performed on the retrieved parameters and the input value 20 to produce the output value 30. The retrieved parameters include the zero-order parameter 32 and the first-order parameter 33, and the arithmetic operations are performed as follows. First, the first-order parameter 33 is multiplied by the input value 20 to produce a proportional term. In a preferred embodiment of the present invention, the first-order parameter 33 is multiplied by a bit slice 21 of the input value 20. Next, the proportional term and the zero-order parameter 32 are summed to produce the output value 30.

Referring now to box 70, the plurality of parameters are computed as follows. First, a domain of input values is selected for the function. The domain is then partitioned into a plurality of intervals. The function is approximated, over the domain of input values, with a first-order linear equation having a plurality of parameters. Next, the parameters for an interval are computed using a least squares method. The interval parameters are then stored in the memory 24.

In a preferred embodiment of the present invention, log and inverse-log functions are approximated with a first-order linear equation having the form:

$$y = b_0 + b_1 x \quad (2)$$

where y represents the log or inverse-log value, $b_0$ represents the zero-order parameter, $b_1$ represents the first-order parameter, and x represents an input value.

The domain of input values is partitioned into 256 intervals which each contain 256 data points, or base points. For each interval, the parameters $b_0$ and $b_1$ are calculated using linear regression on the data points.

Figure 5:
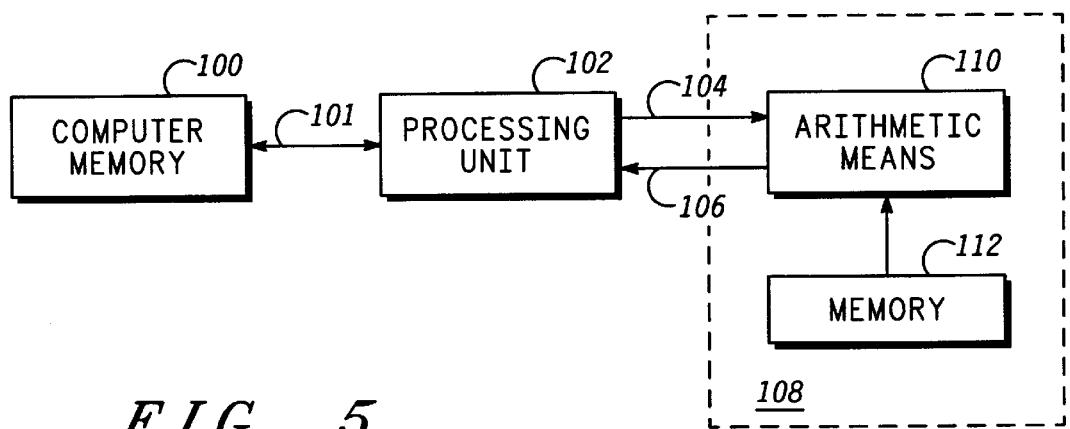
FIG. 5 illustrates one version of a computing device which incorporates an embodiment of the present invention.
Figure 6:
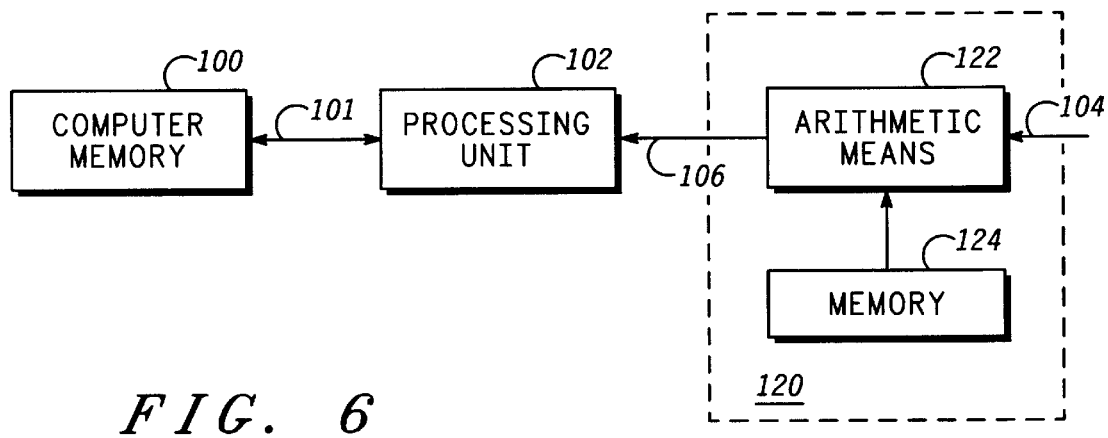
FIG. 6 illustrates another version of a computing device which incorporates an embodiment of the present invention.

FIG. 5 illustrates one version of a computing device which incorporates an embodiment of the present invention. The computing device comprises a processing unit 102 for executing a computer operation which utilizes a log/inverse-log value 106; a computer memory 100 for storing a computer program which includes the computer operation; a bus 101 connecting the processing unit 102 and the computer memory 100; and a converter 108 which receives an input value 104.

The converter 108 may include the converter shown in FIG. 1. In the example shown, the converter 108 includes a memory 112 and an arithmetic means 110, such as a arithmetic logic unit or similar device, which is operatively coupled to the memory 112. The arithmetic means receives the input value 104 from the processing unit 102 and, in turn, generates either a log value or an inverse-log value depending on the parameters stored in the memory 112.

FIG. 7 illustrates another version of a computing device which incorporates an embodiment of the present invention. The computing device comprises a processing unit 102 for executing a computer operation which utilizes a log/inverse-log value 106; a computer memory 100 for storing a computer program which includes the computer operation; a bus 101 connecting the processing unit 102 and the computer memory 100; and a converter 120 which receives an input value 104.

The converter 120 may include the converter shown in FIG. 1. In the example shown, the converter 120 includes a memory 124 and an arithmetic means 122 which is operatively coupled to the memory 124. The arithmetic means 122 receives the input value 104 and, in turn, generates either a log value or an inverse-log value depending on the parameters stored in the memory 124.

Thus there has been described herein a concept, as well as a preferred embodiment, of a converter which may be used to compute either log or inverse-log functions. Because the embodiment of the converter as herein-described utilizes a first-order polynomial to approximate a function it can perform either a log or inverse-log conversion using single adder, a single multiplier, and a look-up table which allows a significant reduction in memory size. Such a converter allows both improved data throughput and computation precision with a vast reduction in the cost and complexity of implementation, whether on a semiconductor chip or in a computer program.

While the various embodiments of the present invention have been described in terms of the processing of an input value into an output value, the present invention should be construed to include circuits and methods implemented by these circuits for processing an input signal representative of the input value into an output signal representative of the output value.

While specific embodiments of the present invention have been shown and described, it will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. In an electronic apparatus, a method for generating a log signal, comprising the following steps;
   receiving an input signal;
   retrieving from a computer memory at least one of a plurality of parameters in response to the input signal, wherein the at least one of the plurality parameters is calculated using a least squares method to estimate a logarithmic function over a domain of input values;
   performing arithmetic operations on the at least one of the plurality of parameters and the input signal to produce the log signal; and
   using the log signal by the electronic apparatus to produce an output value thereby improving data throughput of a device in which the electronic apparatus is associated with.

2. The method of claim 1, further comprising the following steps:
   calculating a plurality of parameters by using the least squares method; and storing the plurality of parameters in the computer memory.

3. The method of claim 2, wherein the step of calculating includes:
   modeling the logarithmic function with a first order equation having two parameters.

4. The method of claim 2, wherein the step of calculating includes the following substeps:
   selecting a domain of input signals for the logarithmic function;
   partitioning the domain into a plurality of intervals;
   for each of the plurality of intervals:
      selecting a plurality of data points; and
      calculating a plurality of interval parameters by applying the least squares method to the plurality of data points.

5. The method of claim 4, wherein the step of storing includes storing the plurality of interval parameters at a common address in the computer memory.

6. The method of claim 1, wherein the at least one parameter includes a first-order parameter and a zero-order parameter, and the step of performing arithmetic operations includes the following substeps:
   multiplying the first-order parameter by the input signal to produce a proportional term; and
   summing the proportional term and the zero-order parameter to produce the log signal.

7. The method of claim 1, wherein the at least one parameter includes a first-order parameter and a zero-order parameter, and the step of performing arithmetic operations includes the following substeps:

multiplying the first-order parameter by a bit slice of the input signal to produce a proportional term; and summing the proportional term and the zero-order parameter to produce the log signal.

8. In an electronic apparatus, a method for generating an inverse-log signal, comprising the following steps:

receiving an input signal;

retrieving from a computer memory at least one parameter in response to the input signal, wherein the at least one parameter is derived using a least squares method to estimate an inverse-logarithmic function over a domain of input values;

performing arithmetic operations on the at least one parameter and the input signal to produce the inverse-log signal; and using the inverse-log signal by the electronic apparatus to produce an output value thereby improving data throughput of a device in which the electronic apparatus is associated with.

9. The method of claim 8, further comprising the following steps:

calculating a plurality of parameters by using the least squares method; and storing the plurity of parameters in the computer memory.

10. The method of claim 9, wherein the step of calculating includes:

modeling the inverse-logarithmic function with a first order equation having two parameters.

11. The method of claim 9, wherein the step of calculating includes the following substeps;

selecting a domain of input signals for the inverse-logarithmic function;

partitioning the domain into a plurality of intervals;

for each of the plurality of intervals:

selecting a plurality of data points; and calculating a plurality of interval parameters by applying the least squares method to the plurity of data points.

12. The method of claim 11, wherein the step of storing includes storing the plurality of interval parameters at a common address in the computer memory.

13. The method of claim 8, wherein the at least one parameter includes a first-order parameter and a zero-order parameter, and the step of performing arithmetic operations includes the following substeps:

multiplying the first-order parameter by the input signal to produce a proportional term; and summing the proportional term and the zero-order parameter to produce the inverse-log signal.

14. The method of claim 8, wherein the at least one parameter includes a first-order parameter and a zero-order parameter, and the step of performing arithmetic operations includes the following substeps:

multiplying the first-order parameter by a bit slice of the input signal to produce a proportional term; and summing the proportional term and the zero-order parameter to produce the inverse-log signal.

15. A method of generating one of a log value and an inverse-log value comprising the steps of;

calculating a plurality of parameters using a least squares function to estimate one of a log function and an inverse-log function over a domain of input values;

storing the plurality of parameters in a memory;

receiving an input value;

generating one of a log value and an inverse-log value by performing arithmetic operations on the input value and ones of the plurality of parameters that corresponds to the input value; and using the one of the log value and an inverse-log value by a processing unit to produce an output value thereby improving data throughput of the processing unit.

16. An electronic apparatus to generate one of a log value and an inverse-log value comprising:

a memory to store a plurality of parameters calculated using a least squares function to estimate one of a log function and an inverse-log function over a domain of input values; and an arithmetic unit to receive an input value and to generate one of a log value and an inverse-log value by performing arithmetic operations on the input value and ones of the plurality of parameters that correspond to the input value, wherein the one of the log value and an inverse-log value is used by the electronic apparatus to produce an output value thereby improving data throughput of a device in which the electronic apparatus is associated with.

\* \* \* \* \*